United States Patent [19]
Seffernick et al.

[11] Patent Number: 5,966,117
[45] Date of Patent: Oct. 12, 1999

[54] Z-AXIS SENSING POINTING STICK WITH BASE AS STRAIN CONCENTRATOR

[75] Inventors: Lewis L. Seffernick, Decatur; Robert M. VandenBoom, Markle, both of Ind.; Mark N. Grube, Rockford, Ohio; David L. Poole, Portland, Ind.

[73] Assignee: CTS Corporation, Ellkhart, Ind.

[21] Appl. No.: 08/756,202

[22] Filed: Nov. 25, 1996

[51] Int. Cl.⁶ .................................................. G09G 5/08
[52] U.S. Cl. ...................... 345/161; 74/471 XY; 345/168
[58] Field of Search ................... 345/168, 169, 345/160, 161, 157, 145; 341/22, 34; 400/485; 74/471 XY

[56] References Cited

U.S. PATENT DOCUMENTS

| | | | |
|---|---|---|---|
| Re. 35,016 | 8/1995 | Gullman et al. ...................... | 345/179 |
| 4,680,577 | 7/1987 | Straayer et al. . | |
| 4,825,019 | 4/1989 | Fisher ...................................... | 345/160 |
| 4,876,524 | 10/1989 | Jenkins ............................... | 763/862.04 |
| 4,905,523 | 3/1990 | Okada .................................. | 73/862.04 |
| 4,967,605 | 11/1990 | Okada .................................. | 73/862.04 |
| 4,969,366 | 11/1990 | Okada .................................. | 73/862.08 |
| 5,263,375 | 11/1993 | Okada ................................ | 73/862.042 |
| 5,325,081 | 6/1994 | Roberts ........................................ | 338/5 |
| 5,407,285 | 4/1995 | Franz ...................................... | 400/490 |
| 5,473,347 | 12/1995 | Collas et al. ............................. | 345/169 |
| 5,489,900 | 2/1996 | Cali et al. ................................. | 345/168 |
| 5,521,596 | 5/1996 | Selker et al. ............................... | 341/22 |
| 5,541,622 | 7/1996 | Engle et al. ............................. | 345/161 |
| 5,694,123 | 12/1997 | Selker et al. ............................. | 345/168 |
| 5,712,660 | 1/1998 | Martin ..................................... | 345/160 |
| 5,754,166 | 5/1998 | Baba ........................................ | 345/157 |
| 5,754,167 | 5/1998 | Narusawa et al. ....................... | 345/168 |

*Primary Examiner*—Brent A. Swarthout
*Attorney, Agent, or Firm*—Michael W. Starkweather; Mark P. Bourgeois

[57] ABSTRACT

A pointing stick for controlling the positioning, movement and operation of a cursor on the display screen. Strain gages 30 are mounted on the sides of the stick 12 and are made of pressure sensitive strips 32, for electrically changing the resistance of the material in response to the amount of strain applied thereto. A conductive contact bridge 34 for electrically connecting the two strips 32, and conductive contact pads 36 for making electrical contact to electronic circuitry (not shown) are also mounted on the sides of the stick 12. The stick 12 extends through a hole 38 in the base 4 in a Z-axis oriented direction 39, and is held in place by an adhesive bond epoxy 40. Cable 18 is positioned within cavity 16 and adhesively bonded to the cavity wall via adhesive 42. Cable 18 has electrical traces 44 and input/output (I/O) pads 46 mounted thereon. Contact pads 36 are bonded to I/O pads 46 by any suitable bond material 50.

45 Claims, 4 Drawing Sheets

Z-AXIS SENSING POINTING STICK WITH BASE AS STRAIN CONCENTRATOR

BACKGROUND OF THE PREFERRED EMBODIMENT(S)

1. Field of the Preferred Embodiment(s)

This invention generally relates to a pointing device for controlling the positioning, movement and operation of a cursor on a display screen. Specifically, there is a pointing stick that both directs a cursor and acts as the activation button for selecting items on the display screen by tapping on the pointing stick instead of clicking on a mouse button.

2. Description of the Related Art

Various devices are well known for controlling cursor movement over a computer display screen of a computer and for signaling a choice of computer command identified by the position of the cursor on the display screen menu. One such device is a "mouse" which has a ball on its underside rolled over a horizontal surface, with the x- and y-axis components of movement being sensed and transmitted through a connecting cable to a serial input port of the computer. The signal to the computer is varied by the amount and direction of movement of the mouse ball, and causes the cursor on the display screen to have a corresponding movement. One or two "mouse" or "click" buttons located on the top of the mouse at the forward end permit the computer operator to enter a selection or other command to the computer (the command typically being shown by the position of the cursor on a displayed menu) upon pressing one or the other or both buttons, depending upon the software associated with the device. Such a device, which is separate from the computer console and keyboard and requires a connection to a computer port, requires a flat, horizontal surface, and for operation of the mouse, the computer operator must completely remove one hand from the computer keyboard.

Another cursor controlling and signaling mechanism is a "joystick" which like the mouse is completely separated from the computer console and keyboard. The joystick is typically an elongated stick that extends upwardly from a base connected to the computer console by means of a cable. The joystick is operated by tilting the upstanding stick in various directions to cause the cursor or other display element to move in a direction and usually at a speed corresponding to the direction and pressure exerted on the stick by the computer operator. The operation of a joystick, however, frequently requires that both hands be removed from the computer keyboard, one hand to hold the base while the other manipulates the joystick. A "click" button is usually located on the joystick. Although a mouse or a joystick can be used with a portable "laptop" or "notebook" size computers, such devices are cumbersome, must be carried separately and connected to the computer before use, and are not suitable for operation during travel.

Still, another type of cursor controlling device is a "trackball." This device, which in essence is an inverted mouse, includes a rotatable ball mounted within a housing. The ball is rotated by a finger, thumb or palm of the computer operator, and the x- and y-components of movement are sensed and input into the computer to cause corresponding movement of the cursor across the display screen. "Mouse" or "click" buttons are usually located on the trackball housing, although with some models the selection signal is input by pressing the "enter" key on the standard keyboard. This type of pointing device has been found useful with portable computers because it can be temporarily affixed to one side of the computer case for manipulation by one hand of the computer operator. However, although trackball devices can be removably attached to the computer case, they still require attachment before use and removal after use. It is also noted that some trackballs are built into the computer keyboard. Nonetheless, these trackballs require a separate set of "click" buttons for selection of items on the display monitor.

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. However, the manufacturer has to provide upwardly extending "mouse" or "click" buttons somewhere on the computer.

Despite the advantages of each type of cursor control, none have allowed the user to both control the cursor movement and select items on the display using exclusively a pointing stick device. Additionally, no prior art allows the user this dual control by using only one finger while allowing the remaining fingers to reside on the home row of the standard keyboard.

DESCRIPTION OF RELATED ART

Examples of patents related to the present invention are as follows, wherein each patent is herein incorporated by reference for related and supporting teachings:

U.S. Pat. No. Re. 35,016, is a three-axis force measurement stylus.

U.S. Pat. No. 5,489,900, is a strain sensitive columnar transducer for a data entry keyboard contains a column upstanding from the keyboard.

U.S. Pat. No. 5,521,596, is a sensor device placed either underneath a key cap or a key on a keyboard or between two keys on a keyboard so that cursor movement may be carried out from the keyboard itself.

U.S. Pat. No. 5,489,900, is a force sensitive transducer for use in a computer keyboard.

U.S. Pat. No. 5,473,347, is a computer pointing device for controlling the positioning, movement and operation of a cursor on the display screen of a computer.

U.S. Pat. No. 5,407,285, is an apparatus for use in a computer keyboard for cursor control is disclosed.

U.S. Pat. No. 5,325,081, is a supported strain gauge and joy stick assembly and method of making.

U.S. Pat. No. 5,263,375, is a contact detector using resistance elements and its application.

U.S. Pat. No. 4,969,366, is a moment detector using resistance elements.

U.S. Pat. No. 4,967,605, is a detector for force and acceleration using resistance elements.

U.S. Pat. No. 4,905,523, is a force detector and moment detector using resistance elements.

U.S. Pat. No. 4,876,524, is an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

U.S. Pat. No. 4,680,577, is a multipurpose key switch for controlling cursor movement on a CRT display and for character entry includes a key cap that moves laterally to provide cursor control and that moves vertically for character entry.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicants' claimed invention.

SUMMARY OF THE PREFERRED EMBODIMENT(S)

It is a feature of the invention to provide a pointing stick for controlling the positioning, movement and operation of a cursor on the display screen.

A further feature of the invention is to provide a pointing stick assembly using resistor based strain gages mounted on the sides of the shaft of the pointing stick. Wherein, the strain gages are for sensing when either the stick or base is being bent. Upon bending, strain is created on the resistor based strain gages. Wherein, the strain gages are coupled to circuitry that will produce signals in response to the strain on the gages. The resulting signals are used to either control the movement of the cursor around the display screen, or to do what is commonly called "clicking" a mouse button for selection of items or dragging of items on the display screen.

Yet, a further feature of the invention is to provide a device that has a pointing stick extending through the base so that the side mounted strain gages extend through the bendable base. Thus, when the stick is pushed downward along the z-axis, the base will exert pressure on all strain gages.

Another feature of the invention is to provide a pointing stick that may have a recessed area or cavity on the base above or below around the location of the shaft of the pointing stick. The recessed area or cavity area may be more flexible than the remaining base structure and typically may contain a flexible cable containing the electrical traces leading to and from the strain gages and to the electrical circuitry used to create the appropriate cursor control signals.

A further feature of the invention is to provide an easy method or design for coupling the electrical traces located on the flexible cable to the resistor based strain gages.

The invention resides not in any one of these features per se, but rather in the particular combination of all of them herein disclosed and claimed and it is distinguished from the prior art in this combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

Further, the purpose of the abstract is to enable the public generally, and especially the scientists, engineers and practitioners in the art who are not familiar with patent or legal terms or phraseology, to find out quickly from a cursory inspection the nature and essence of the technical disclosure of the application. The abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
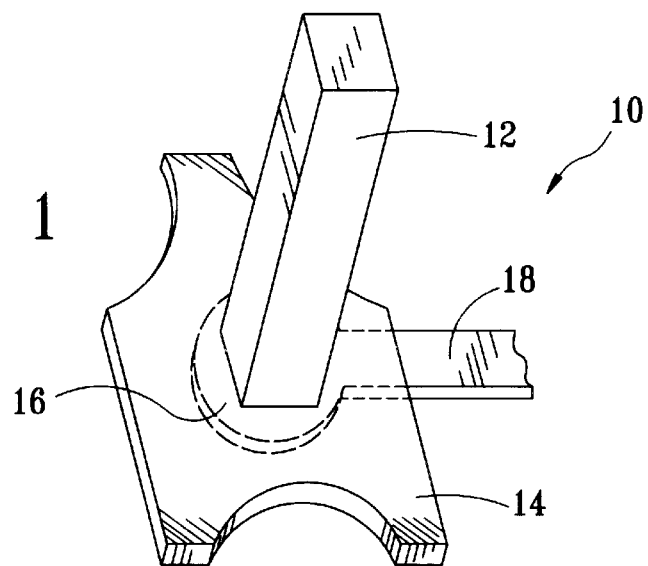
FIG. 1 is a perspective view of a preferred embodiment of the pointing stick.
Figure 2:
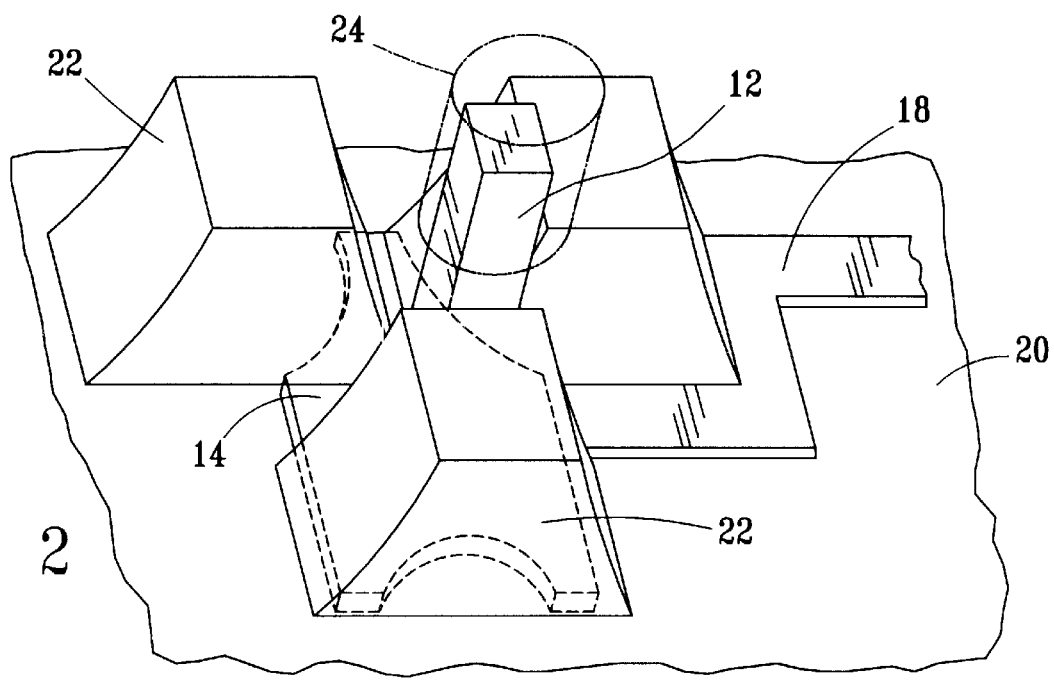
FIG. 2 is a perspective view of the pointing stick in FIG. 1 as placed between keys of a keyboard.

Referring to both FIGS. 1 and 2, there is a pointing stick 10 that can be used to control the movement of a curser on a computer screen (not shown). In particular, the pointing stick 10 is made up of a stick 12 (or shaft), a substrate 14 for supporting the stick 12, and a cavity 16 formed in the base 14 for placement of a flexible cable 18 that is electrically connected to four strain gages (not shown) located on the sides of the stick 12. The stick may be made of alumina ceramic material. Typically, the cable 18 may be made of polyamide material containing electrical traces thereon. The pointing stick 10 is typically positioned on the supporting base 20 and between the B, G and H keys 22 of a typing keyboard. Typically, the pointing stick has a rubber-like cap 24 positioned over the top of stick 12 to increase the ease of operation. The cap is designed to enable the operator to control the cursor with a single finger positioned on top of it and pushing in desired cursor direction. The finger pressure causes strain in the stick that is sensed by the sensitive gages (not shown). The base 14, made of epoxy glass, FR4, or molded polycarbonate material, to name a few, will have some impact upon the strain gages because of the increased flexibility of the base around the gages.

Figure 3:
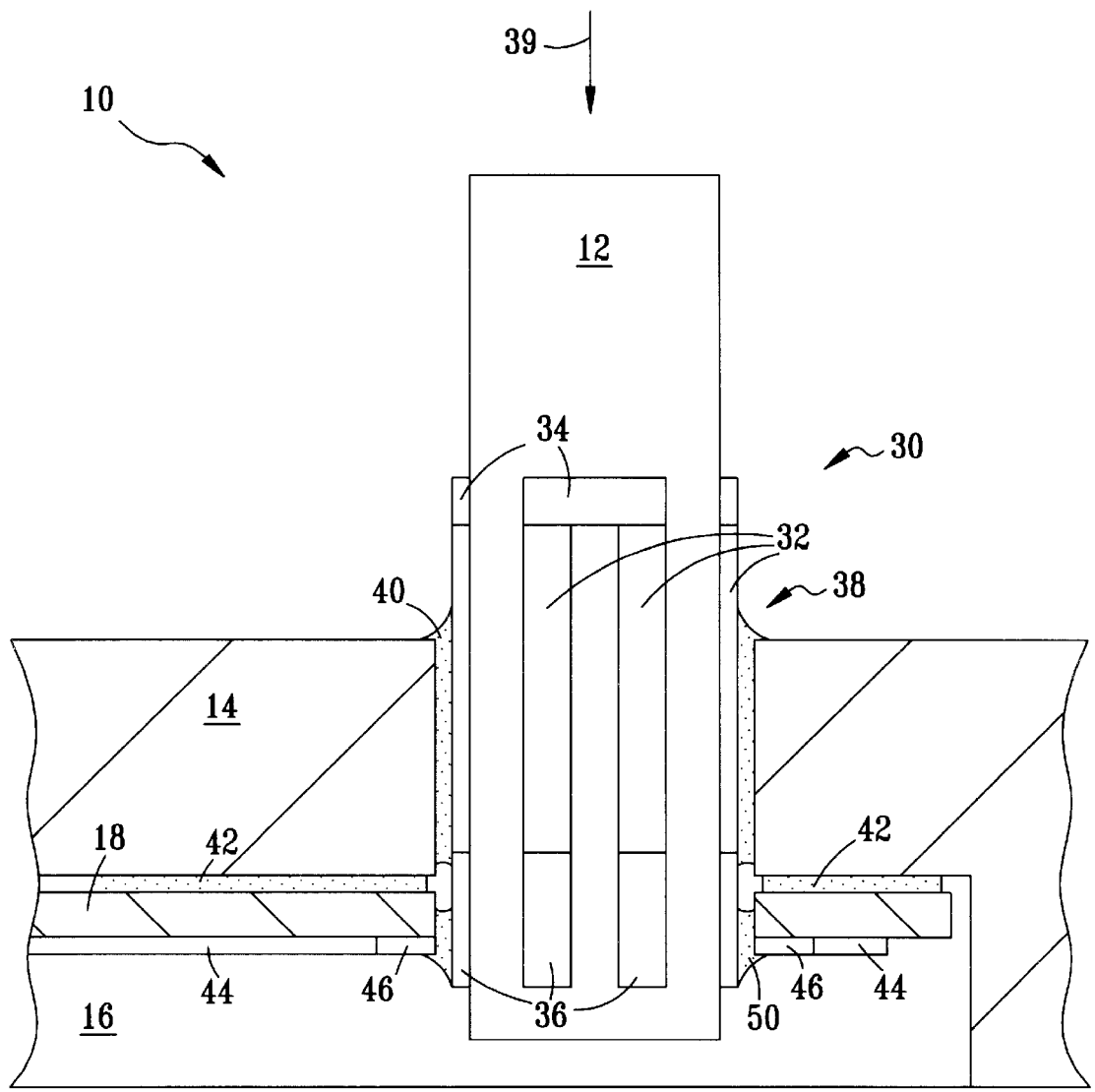
FIG. 3 is a cross-sectional view of FIG. 1

Referring to FIG. 3, there is a cross-sectional view of FIG. 1 taken along the edge of cable 18 and along the one side of the stick 12. In particular, the following additional elements are illustrated: Strain gages 30 are mounted on the sides of the stick 12 and are made of pressure sensitive strips 32, for electrically changing the resistance of the material in response to the amount of strain applied thereto, a conductive contact bridge 34 for electrically connecting the two strips 32, and conductive contact pads 36 for making electrical contact to electronic circuitry (not shown) via flexible cable 18. The stick 12 extends through hole 38 in a z-axis direction 39, and is held in place by an adhesive bond epoxy 40. For example, a cyanoacrylate adhesive material is also suitable. Cable 18 is positioned within cavity 16 and adhesively bonded to the cavity wall via adhesive 42. Cable 18 has electrical traces 44 and input/output (I/O) pads 46 mounted thereon. Contact pads 36 are bonded to I/O pads 46 by any suitable bond material 50, like tin-lead solder. The pointing stick 10 can be assembled as follows: The first step usually involves either the screening of resistive thick film or the sputtering of resistive thin film material on the sides of stick 12. The screened on material forms the strain gages 30. The second step often involves the placement of the stick 12 into the substrate 14 (or base). Thereafter, usually flexible cable 18 is attached to connect the strain gages 30 to circuitry (not shown). At this stage, a certain amount of bonding material 40 is applied onto the substrate to secure the stick 12 to the substrate 14. Next, the solder material may be placed around the stick 12 to attach all eight I/O pads 46 to all eight contact pads 36, two on each side of the stick 12. Finally, the whole assembly is cured to harden the bonding materials.

Figure 4:
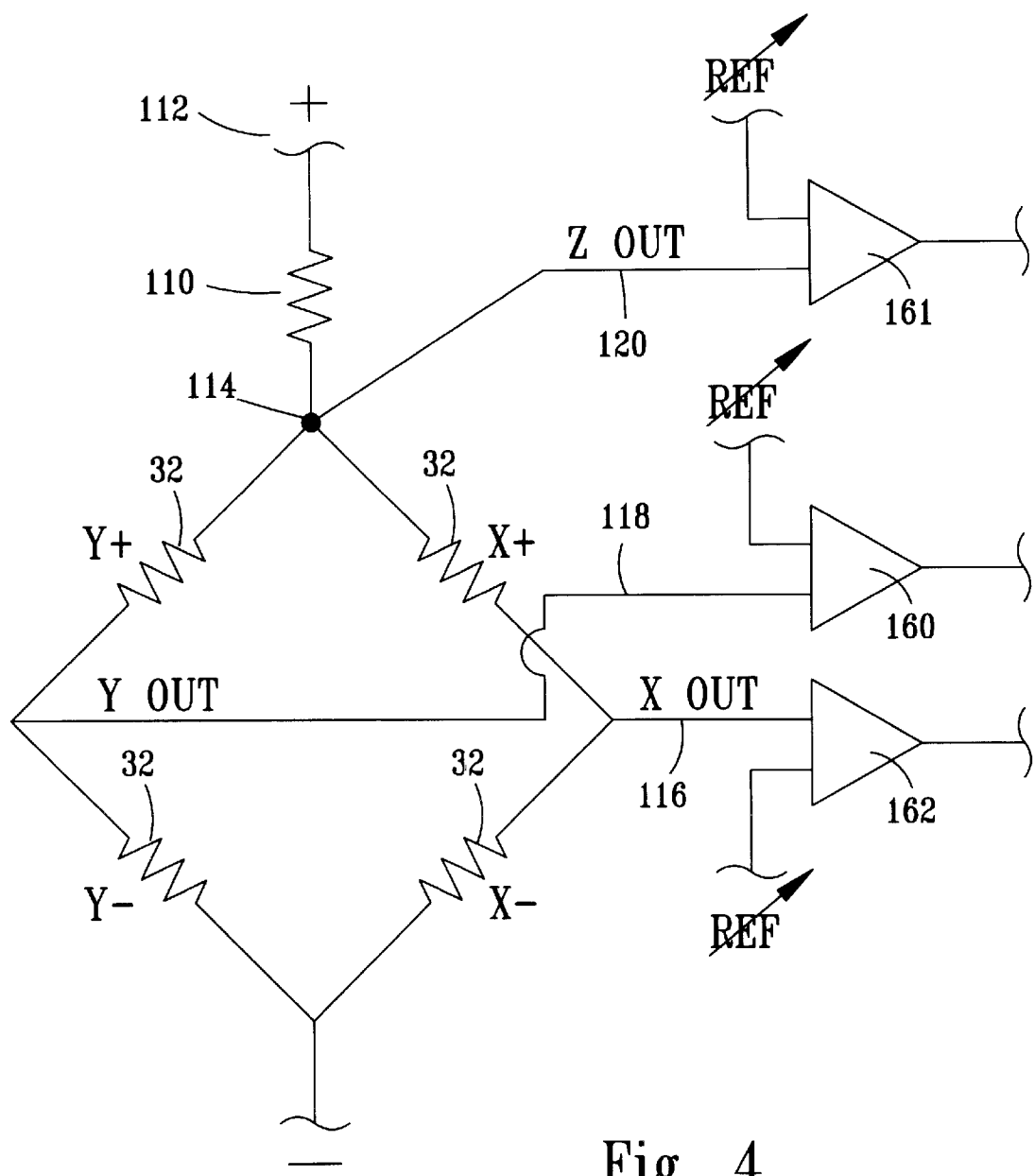
FIG. 4 is an electrical schematic of a bridge circuit incorporating the strain sensitive elements.

In reference to FIG. 4, there is an electrical schematic of a bridge circuit incorporating the strain sensitive elements. Specifically, this circuit is an example of how the z-axis pointing stick can be arranged to interface with the electronics (not shown). The strain sensitive resistors 32 on opposing sides of the stick 12 are configured in two half bridge circuits, resistors 32 Y+ and 32 Y− form a first half bridge, and resistors 32 X+ and 32 X− form the second half bridge. A fixed resistor 110 is connected between the supply voltage 112 of the system and node 114. The X, Y, and Z OUT outputs, 116, 118, and 120 respectively, are amplified by the three differential amplifiers 160, 161, and 162. Each amplifier has a variable reference voltage input. These reference voltages are calibrated to set the output to zero when no force is applied to the stick 12. The X and Y axis outputs 116 and 118 are developed when an X or Y directional force is applied to the stick 12. For example, when a force is applied in the X direction, the X− and X+ strain sensitive resistors change resistance in opposite directions and cause an output change. The same is true for the Y-axis. A Z-axis output is developed when a Z-axis force is applied to the top of the stick 12. Force in the Z-axis causes all resistors 32 on the stick 12 to change in a negative direction. This change lowers the total impedance of the two half bridges. The lower bridge impedance causes a voltage change in the Z output 120 since the series resistor 110 is fixed.

Figure 5:
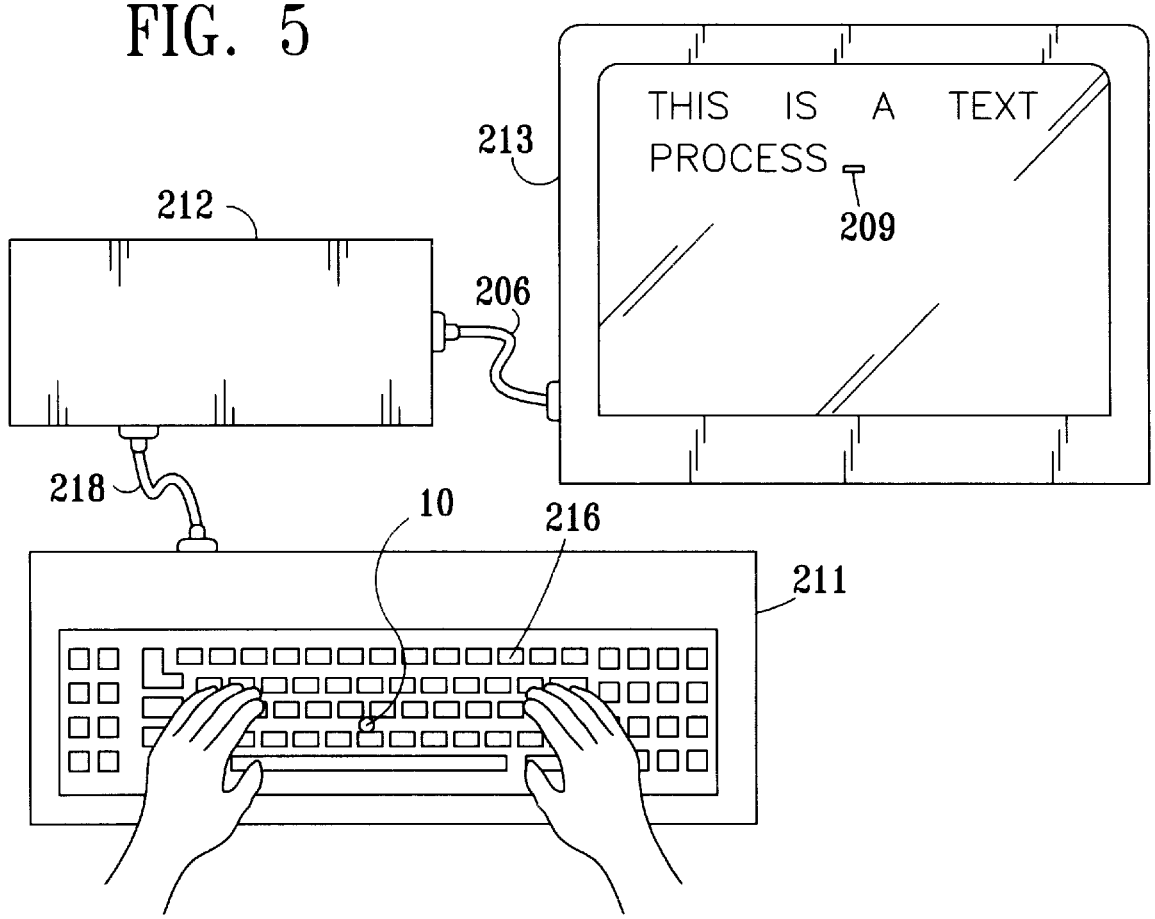
FIG. 5, is an illustration of the pointing stick as used on a keyboard operated computer system.

Referring to FIG. 5, there is shown a keyboard operated computer system. The system includes a keyboard 211 implemented by this invention and connected to a computer 212. The data entry from the keyboard 211 is displayed on a computer display or monitor 213 during the normal course of operation of an application program. The keyboard has a layout of keys 216 that is an industry standard. The keyboard is shown to have an output cable 218 coupled to the computer 212. The computer is coupled to the monitor via connecting cable 206. A cursor 209 is displayed on the computer monitor 213. The pointing stick 10 is located in the middle of the keyboard 211.

Remarks About the Preferred Embodiment

One of ordinary skill in the arts of strain gages and ceramic materials, and more particularly the art of designing pointing sticks with strain gages on the sides, will realize many advantages from using the preferred embodiment. In particular, strain gages are devices that sense the amount and of applied pressure placed upon the pointing stick. The sensed pressure creates electrical output signals used to direct the cursor on a display device. Thus, the side mounted strain gages enables control of both the directions of the cursor movement and the selection of items on the display device by tapping the pointing stick like the clicking of a mouse button. Of course, a skilled artisan will realize that the base 14 may have some flexure in a downward direction during the application of tapping force, especially if a sufficiently designed cavity is placed around the stick. Specifically, the flexing of the base 14 around the cavity will cause some force to be applied to the sensor from the top portion of the walls of the hole 38. However, the stick and sensor design can equally work without a cavity or flexure of the base sides walls by simply sensing the strain created in the stick 12.

Additionally, a skilled artisan will understand that the strain gages may be made of thick films piezo-resistive material, which are applied using known screen techniques.

It is further noted that a skilled artisan would realize that the pointing stick 10 is capable of now performing selection and dragging of icons on a monitor in addition to double clicking for selection of an item. In this operation, the user would hold down the pointing stick 10 while exerting additional force in the X-Y plane for controlling the direction of the icon being dragged. All of these functions are now capable of being performed with a single finger while the remaining fingers are located on the keyboard.

Variations of the Preferred Embodiment(s)

One of ordinary skill in the art of making pointing stick will realize that there are many different ways of accomplishing the preferred embodiment. For example, although it is contemplated to make the pointing stick 12 and substrate 14 out of ceramic material, where any suitable material would work, like plastics, epoxy resin, or metals etc. Additionally, although bonding compound 40 is illustrated to be placed between the substrate 14 and the stick 12, it may not be required when the hole 38 fits securely around the stick 12. This is equally true for material 50 if the flexible cable 18 fits securely around stick 12, in which only a small amount of solder may be needed to enhance electrical contact therebetween.

Although it is illustrated that the cavity 16 be placed on the bottom side of the substrate or base 14, it is equally contemplated to place the cavity on the top side of the base. In fact a cavity need not exist at all if the flexible cable 18 were to be placed upon the top side of the base 14. The cavity 16 exists for the protection of the flexible cable 18 when mounted on the bottom. Even if it were mounted on the bottom a cavity is not needed if other means are provided to protect the cable 18 from harmful and abrasive actions; for example a couple of tabs or posts could be used to lift the bottom of the base off a supporting surface 20.

Even though, the embodiment discusses the use of strain gages on all four sides of the stick 12, it is contemplated to use only two sides of the stick 12 for sensing only either the positive or negative strain on the bending of the stick for creating the resulting control signals.

Additionally, eventhough the illustrated embodiment shows the stick extending through the base, it is contemplated not to extend the stick all the way through the base. While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A device for controlling the movement of an object on a display screen, comprising:

a) a shaft having a longitudinal length oriented along a first axis;
   b) a base having the shaft mounted thereinto; and
   c) a sensor, mounted circumferentialy around the shaft oriented along the first axis, and extending into the base, for conditioning an output signal indicative of a force exerted on the shaft.

2. The device of claim 1, further comprising:

a cavity formed in the base and located around the shaft; and
   the sensor extending into the cavity.

3. The device of claim 2, further comprising:

an input trace positioned in the cavity and abutting to the sensor, for coupling the sensor to a voltage source; and
   an output trace positioned in the cavity and coupling to the sensor, for outputting signals indicative of the direction that the shaft is being forced.

4. The device of claim 3, further comprising:

a flexible cable for supporting the input and output traces and mounted on the base.

5. The device of claim 4, further comprising:

a bonding material located between opposing surfaces of the shaft and the base for securely bonding the shaft to the base.

6. The keyboard according to claim 1, wherein the sensor has a plurality of strain sensitive resistors mounted on the shaft and electrically connected in a bridge configuration such that the force exerted along the first axis causes an overall resistance of the bridge to be lowered.

7. The keyboard according to claim 1, wherein a portion of the sensor extends into the base.

8. The device of claim 7, further comprising:

an input trace positioned on the base and abutting to the sensor, for coupling the sensor to a voltage source; and
   an output trace positioned on the base and coupled to the sensor, for outputting signals indicative of the direction that the shaft is being forced.

9. The device of claim 8, further comprising:

a flexible cable for supporting the input and output traces that is mounted on the base.

10. The device of claim 9, further comprising:

a cavity formed in the base and located around the shaft sufficient to house the flexible cable for protection thereof.

11. The device of claim 10, wherein the cavity is mounted on the bottom of the base.

12. A keyboard for entering data in an information system, comprising:

a) at least two keys located on the keyboard;
    b) a shaft, located in proximity of and extending up toward a top surface of the two keys, having a longitudinal length oriented along a first axis extending toward the top surface;
    c) a base having a top and bottom side, and the shaft mounted therethrough; and
    d) a sensor, mounted circumferentialy around the shaft oriented along the first axis and extending into the base, for conditioning an output signal indicative of a force exerted on the shaft.

13. The keyboard of claim 12, further comprising:

a cavity mounted in the base and located around the shaft.

14. The keyboard of claim 13, further comprising:

an input trace positioned in the cavity and abutting to the sensor, for coupling the sensor to a voltage source; and
    an output trace positioned in the cavity and coupling to the sensor, for outputting signals indicative of the direction that the shaft is being forced.

15. The keyboard of claim 14, further comprising:

a flexible cable for supporting the input and output traces is mounted on the base.

16. The keyboard of claim 15, further comprising:

a bonding material located between opposing surfaces of the shaft and the base for securely bonding the shaft to the base.

17. The keyboard according to claim 12, wherein the sensor has a plurality of strain sensitive resistors mounted on the shaft and electrically connected in a bridge configuration such that the force exerted along the first axis causes an overall resistance of the bridge to be lowered.

18. The keyboard according to claim 12, wherein a portion of the sensor extends into the base.

19. The keyboard of claim 18, further comprising:

an input trace positioned on the base and abutting to the sensor, for coupling the sensor to a voltage source; and
    an output trace positioned on the base and coupled to the sensor, for outputting signals indicative of the direction that the shaft is being forced.

20. The keyboard of claim 19, further comprising:

a flexible cable for supporting the input and output traces that is mounted on the base.

21. The keyboard of claim 20, further comprising:

a cavity mounted in the base and located around the shaft sufficient to house the flexible cable for protection thereof.

22. The keyboard of claim 21, wherein the cavity is mounted on the bottom of the base.

23. A computer system, including a keyboard, and a monitor, comprising:

a) a monitor, having a cursor thereon for directing computer system work;
    b) at least two keys located on the keyboard that is coupled to send data input to the monitor;
    c) a shaft, located near and extending up toward a top surface of the two keys, having a longitudinal length oriented along a first axis extending toward the top surface;
    d) a base having a top and bottom side, and the shaft mounted therethrough; and
    e) a sensor, mounted circumferentially around the shaft, oriented along the first axis and extending into the base, for conditioning an output signal indicative of a force exerted on the shaft for controlling the cursor on the monitor.

24. The computer system of claim 23, further comprising:

a cavity mounted in the base and located around the shaft; and the sensor extending into the cavity.

25. The computer system of claim 24, further comprising:

an input trace positioned in the cavity and abutting to the sensor, for coupling the sensor to a voltage source; and an output trace positioned in the cavity and coupling to the sensor, for outputting signals indicative of the direction that the shaft is being forced.

26. The computer system of claim 25, further comprising:

a flexible cable for supporting the input and output traces is mounted on the base.

27. The computer system of claim 26, further comprising:

a bonding material located between opposing surfaces of the shaft and the base for securely bonding the shaft to the base.

28. The keyboard according to claim 23, wherein the sensor has a plurality of strain sensitive resistors mounted on the shaft and electrically connected in a bridge configuration such that the force exerted along the first axis causes an overall resistance of the bridge to be lowered.

29. The keyboard according to claim 23 wherein a portion of the sensor extends into the base.

30. The computer system of claim 29, further comprising:

an input trace positioned on the base and abutting to the sensor, for coupling the sensor to a voltage source; and an output trace positioned on the base and coupled to the sensor, for outputting signals indicative of the direction that the shaft is being forced.

31. The computer system of claim 30, further comprising:

a flexible cable for supporting the input and output traces that is mounted on the base.

32. The computer system of claim 21, further comprising:

a cavity mounted in the base and located around the shaft sufficient to house the flexible cable for protection thereof.

33. The computer system of claim 32, wherein the cavity is mounted on the bottom of the base.

34. A keyboard for entering data in an information system, comprising:

a) a homerow of keys located on the keyboard for locating fingers of a user during typing; and b) a cursor control device, mounted on the keyboard, for allowing a user to both select an item on a display device and control the movement of a cursor on the display device by using a single finger of the user while the remaining fingers reside inactive on the homerow, the device including:

b1) resistor means, electrically connected in a bridge such that the bridge has a first resistance value when the item is in an inactive state and has a second resistance value when the item is in an active state;

a) a shaft, located between and extending up toward a top surface of the two keys, having a longitudinal length oriented along a first axis extending toward the top surface, the resistor means circumferentialy mounted to the shaft; and resistor means extending into the base.

35. The keyboard of claim 34, further comprising:

an input trace positioned on the base and abutting to the sensor, for coupling the sensor to a voltage source; and an output trace positioned on the base and coupled to the sensor, for outputting signals indicative of the direction that the shaft is being forced.

36. The keyboard of claim 35, further comprising:

a flexible cable for supporting the input and output traces that is mounted on the base.

37. The keyboard of claim 36, further comprising:

a cavity mounted in the base aid located around the shaft sufficient to house the flexible cable for protection thereof.

38. The keyboard of claim 37, wherein the cavity is mounted on the bottom of the base.

39. The keyboard of claim 34, further comprising:

a cavity mounted in the base and located around the shaft.

40. The keyboard of claim 39, further comprising:

an input trace positioned in the cavity and abutting to the sensor, for coupling the sensor to a voltage source; and an output trace positioned in the cavity and coupling to the sensor, for outputting signals indicative of the direction that the shaft is being forced.

41. The keyboard of claim 40, further comprising:

a flexible cable for supporting the input and output traces is mounted on the base.

42. The keyboard of claim 41, further comprising:

a bonding material located between opposing surfaces of the shaft and the base for securely bonding the shaft to the base.

43. The keyboard according to claim 34, wherein the second resistance value is less than the first resistance value.

44. The keyboard according to claim 34, wherein a portion of the resistor means extends into the base.

45. The keyboard of claim 44, wherein the cursor control device further allows the user to both select the item and drag the item around on the display device.

\* \* \* \* \*